(12) United States Patent
Pawar et al.

(10) Patent No.: US 12,184,049 B2
(45) Date of Patent: Dec. 31, 2024

(54) CABLE GLAND WITH COMPRESSION LIMITING ASSEMBLY

(71) Applicant: Eaton Intelligent Power Limited, Dublin (IE)

(72) Inventors: Rajendra Pawar, Pune (IN); Himanshu Gangadhar Khokle, Pune (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 17/805,527

(22) Filed: Jun. 6, 2022

(65) Prior Publication Data

US 2022/0399709 A1    Dec. 15, 2022

Related U.S. Application Data

(60) Provisional application No. 63/209,471, filed on Jun. 11, 2021.

(51) Int. Cl.
*H02G 15/04* (2006.01)
*H02G 15/007* (2006.01)
*H02G 15/013* (2006.01)

(52) U.S. Cl.
CPC .......... *H02G 15/04* (2013.01); *H02G 15/007* (2013.01); *H02G 15/013* (2013.01)

(58) Field of Classification Search
CPC ....... H02G 15/02; H02G 15/04; H02G 15/085
See application file for complete search history.

(56) References Cited

U.S. PATENT DOCUMENTS

| | | | | | |
|---|---|---|---|---|---|
| 3,733,093 | A | * | 5/1973 | Seiler | F16L 19/08 285/356 |
| 6,354,851 | B1 | * | 3/2002 | Bachle | H02G 15/04 174/650 |
| 6,537,104 | B1 | * | 3/2003 | Hagmann | H02G 3/0666 439/461 |
| RE38,294 | E | * | 11/2003 | Nattel | H01R 13/5205 174/59 |
| 11,637,419 | B2 | * | 4/2023 | Platt | H02G 3/22 174/653 |
| 2005/0103579 | A1 | * | 5/2005 | Meernik | F16F 7/085 267/136 |
| 2010/0167582 | A1 | * | 7/2010 | Watson | H01R 13/5216 439/589 |
| 2013/0056264 | A1 | * | 3/2013 | Aldrich | H02G 15/013 174/665 |

(Continued)

*Primary Examiner* — Chau N Nguyen
(74) *Attorney, Agent, or Firm* — Stinson LLP

(57) ABSTRACT

A cable gland includes a gland nut defining a longitudinal axis. The gland nut includes an interior wall defining a gland nut opening. A bushing is disposed within the gland nut. The bushing defines a bushing opening configured to receive a cable therein. A compression limiting assembly includes a compression limiter moveably disposed at least partially within the gland nut. A spring is disposed between the compression limiter and the bushing. A body defines a body opening configured to receive at least a portion of the cable therein. The body is configured to couple to the gland nut. Upon coupling of the gland nut to the body, the gland nut moves along the longitudinal axis compressing the bushing between the gland nut and the compression limiting assembly and around the cable.

20 Claims, 8 Drawing Sheets

(56) References Cited

U.S. PATENT DOCUMENTS

2021/0135436 A1   5/2021  Khokle et al.
2021/0281053 A1*  9/2021  Hellmann ............ H02G 3/0406
2022/0381311 A1* 12/2022  Jeng ........................ F16F 1/366

* cited by examiner

CABLE GLAND WITH COMPRESSION LIMITING ASSEMBLY

CROSS-REFERENCE TO RELATED APPLICATION

This application claims priority to U.S. Provisional Patent Application Ser. No. 63/209,471, filed Jun. 11, 2021, and which is hereby incorporated by reference in its entirety.

FIELD OF THE DISCLOSURE

The present disclosure generally relates to a cable gland and more particularly to a cable gland having a compression limiting assembly to limit bushing compression.

BACKGROUND OF THE DISCLOSURE

Cable glands are used for terminating cable in hazardous and nonhazardous environments. More specifically, cable glands generally provide a means for terminating cables, such as unarmored cables (e.g., TC-type) and armored cables, at junction boxes, control centers, panelboards, enclosures, and the like. Typical cable glands are used to seal the junction between a cable and a device and/or an enclosure into which the cable is extending. Referring to FIG. 1, conventional cable glands 1 may comprise a hub body 3 for interfacing with the device/enclosure, and a gland nut 5 for securing a bushing 7 to the hub body. The bushing 7 is received in the gland nut 5 and seals around and grips the cable for sealing the interior of the gland from the environment. For example, the bushing 7 may seal around a jacket or outer insulation of the cable. A compression limiter 9 may also be disposed in the gland nut 5 to prevent over compression of the bushing 7 in the cable gland 1.

Cable glands can be used with a range of cable diameters. A contact pressure will vary depending on the size of the cable. In practice, it is recommended to have a contact pressure between the cable and the bushing of more than 2 MPa to avoid water ingress. However, in some instances a contact pressure in conventional cable glands can reach up to 15 MPa. Such a high contact pressure may damage the cable jacket causing water ingress after high temperature conditioning/aging. Aging may also cause the bushing material to set permanently which can cause a reduction in contact pressure allowing further water ingress.

SUMMARY OF THE DISCLOSURE

In one aspect, a cable gland generally comprises a gland nut defining a longitudinal axis. The gland nut comprises an interior wall defining a gland nut opening. A bushing is disposed within the gland nut. The bushing defines a bushing opening configured to receive a cable therein. A compression limiting assembly comprises a compression limiter moveably disposed at least partially within the gland nut. A spring is disposed between the compression limiter and the bushing. A body defines a body opening configured to receive at least a portion of the cable therein. The body is configured to couple to the gland nut. Upon coupling of the gland nut to the body, the gland nut moves along the longitudinal axis compressing the bushing between the gland nut and the compression limiting assembly and around the cable.

In another aspect, a cable gland generally comprises a body configured to receive at least a portion of a cable. A grounding mechanism is disposed at least partially in the body. A gland nut is configured to receive at least a portion of the cable and removably couple to the body. A bushing is disposed in the gland nut. A stacked wave spring is disposed in the gland nut. Upon coupling of the gland nut to the body, the stacked wave spring is configured limit compression of the bushing.

In yet another aspect, a cable gland generally comprises a gland nut defining a longitudinal axis. The gland nut comprises an interior wall defining a gland nut opening. A bushing is disposed within the gland nut. The bushing defines a bushing opening configured to receive a cable therein. A body define a body opening configured to receive at least a portion of the cable therein. The body is configured to couple to the gland nut. Upon coupling of the gland nut to the body, the gland nut moves along the longitudinal axis compressing the bushing around the cable. A compression limiting assembly is disposed at least partially within the gland nut and configured to maintain a constant contact pressure between the cable gland and the cable.

DETAILED DESCRIPTION OF THE DISCLOSURE

The cable gland described herein has features that when tightening the cable gland, limit the compression of a bushing so as to prevent over-compression thereof. At the same time, further tightening of the cable gland is enabled and the resulting compression load is directed away from the bushing. This produces a cable gland assembly that enables an increased final assembly torque to be reached, such that various construction requirements dictated by appropriate certification standards can be met. Additionally, proper electrical contact between the cable and a grounding mechanism of the cable gland is facilitated without extruding the bushing from a gland nut. These features are enabled while the cable gland assembly maintains a two-piece gland design that uses a single tightening motion to compress both the grounding mechanism and the bushing.

In the below examples, the cable gland has a compression limiting assembly disposed in the gland nut. This limiting assembly enables the bushing to be compressed to a predetermined distance, and once this distance is reached, further compressive loads are away from the bushing, such as towards the compression limiting assembly and/or grounding mechanism, to prevent over-compression of the bushing. By limiting compression loads on the bushing, a broader range of elastomeric materials (e.g., silicone) may be used in the cable gland assembly. For example, high temperature elastomeric materials, such as silicone, generally do not have a high compressive strength, but may be used in the cable gland described herein because of the compression limiting assembly. This provides a cable gland with a larger operable temperature range and increases its performance.

Many components of the cable gland may be referred to as having generally cylindrically, circular, annular, or conical features, and as having cylindrical or circular holes, cavities, and openings. Such features may be referred to, or defined by, a circumference, radius, external surface, internal surface, and/or other terms appropriate for defining such features. It should be noted that such features may alternatively be elliptical, polygonal, and the like. As used herein, the terms "axial" and "longitudinal" refer to directions and orientations, which extend substantially parallel to a centerline of the cable gland. Moreover, the terms "radial" and "radially" refer to directions and orientations, which extend substantially perpendicular to the centerline of the cable gland assembly. In addition, as used herein, the terms "circumferential" and "circumferentially" refer to directions and orientations, which extend arcuately about the centerline of the cable gland assembly.

Figure 1:
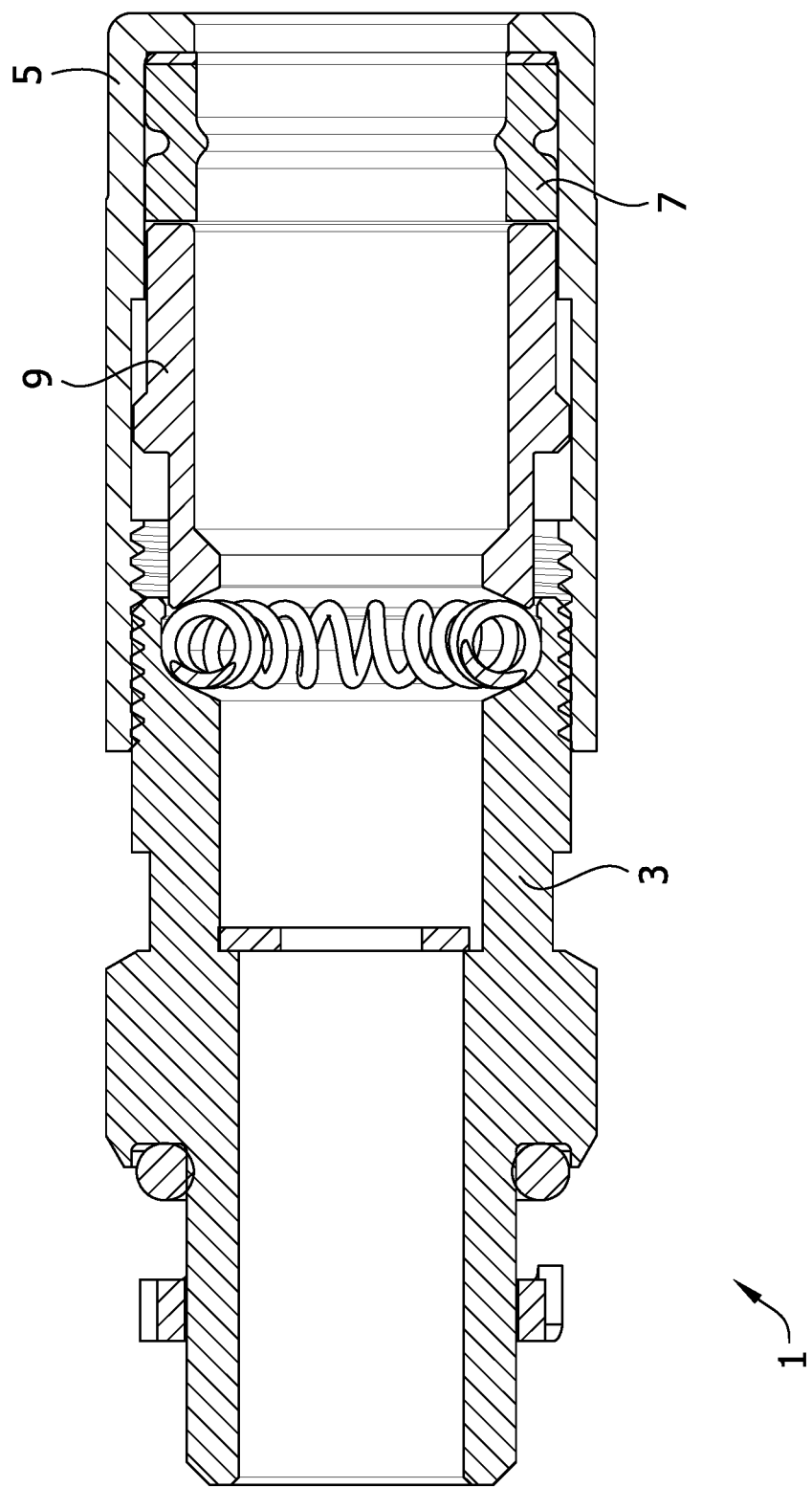
FIG. 1 is cross section of a cable gland of the prior art.
Figure 2:
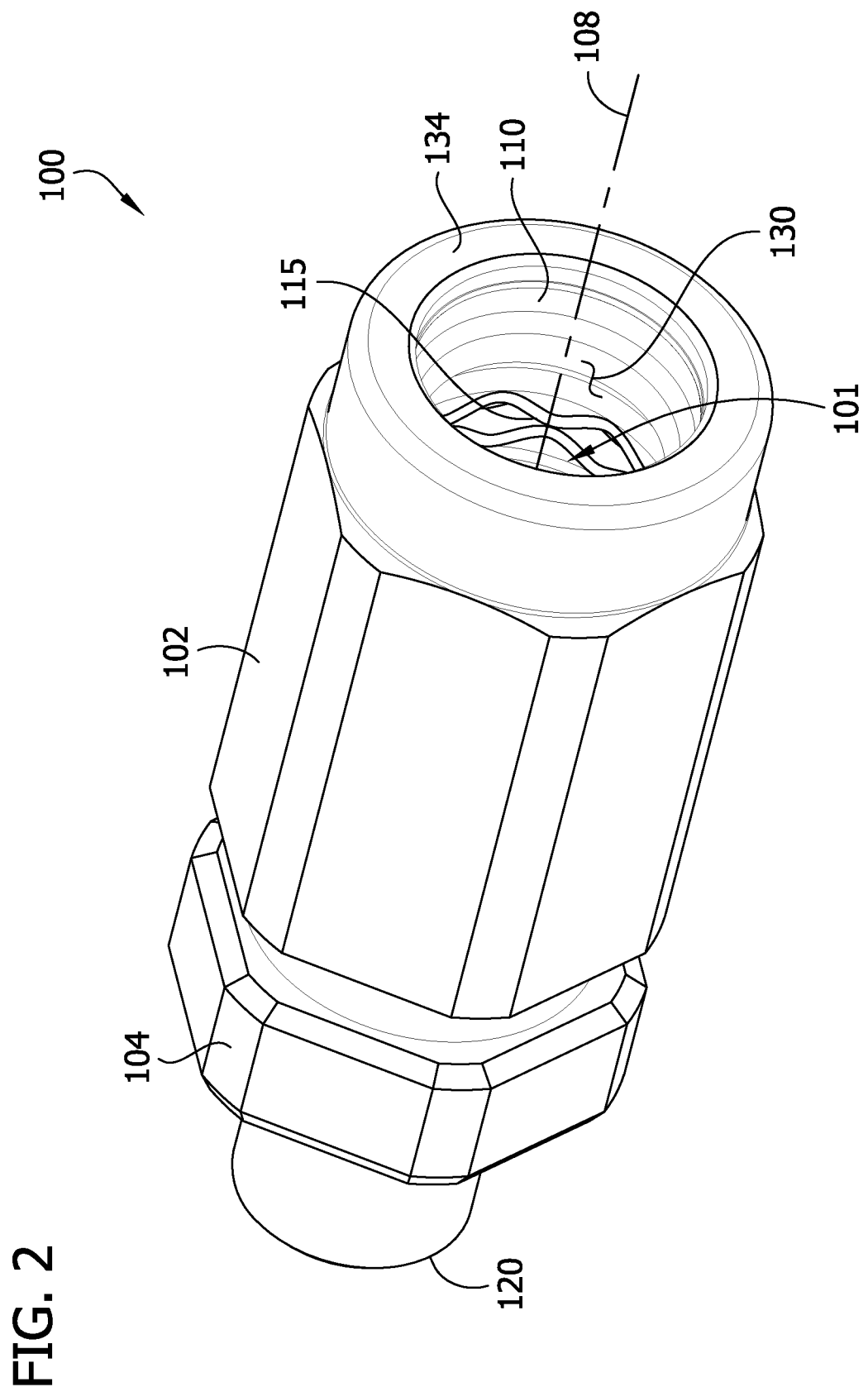
FIG. 2 is a perspective of a cable gland of the present disclosure.
Figure 3:
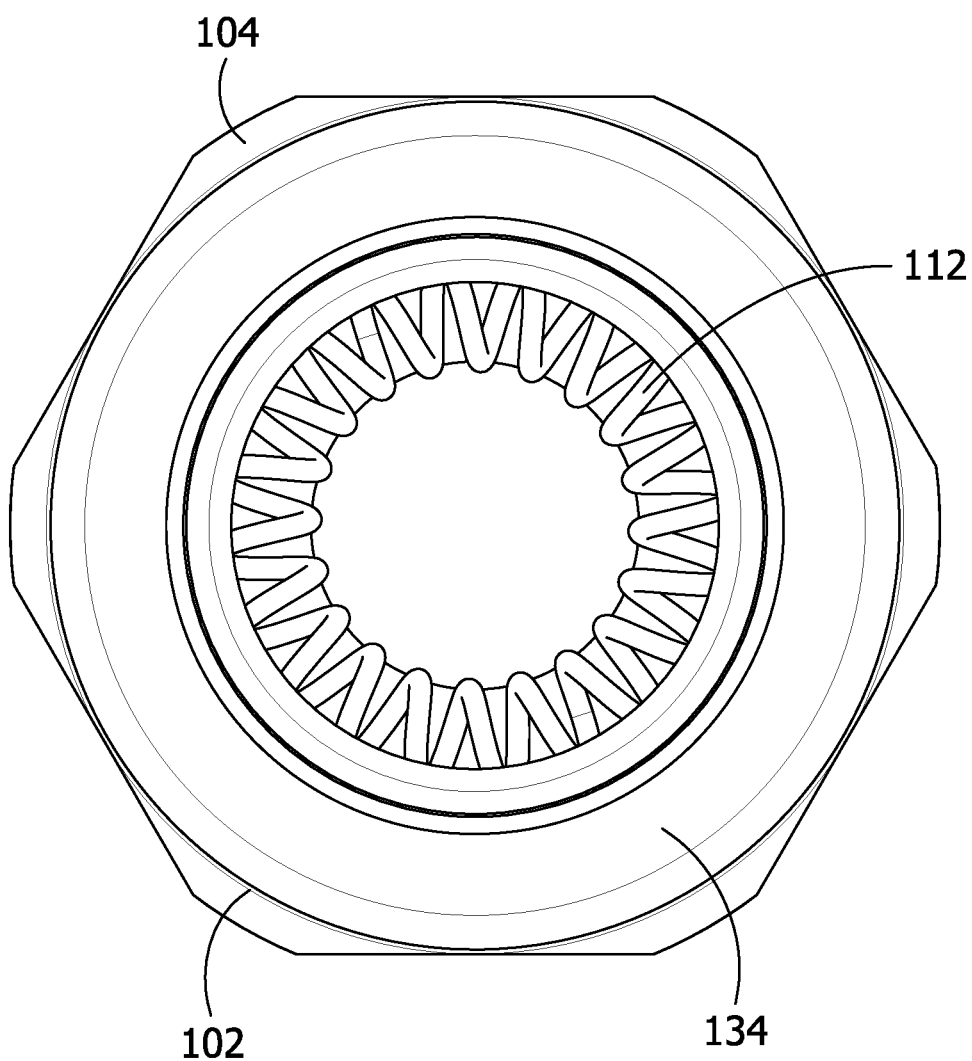
FIG. 3 is an end view of the cable gland in FIG. 1.
Figure 4:
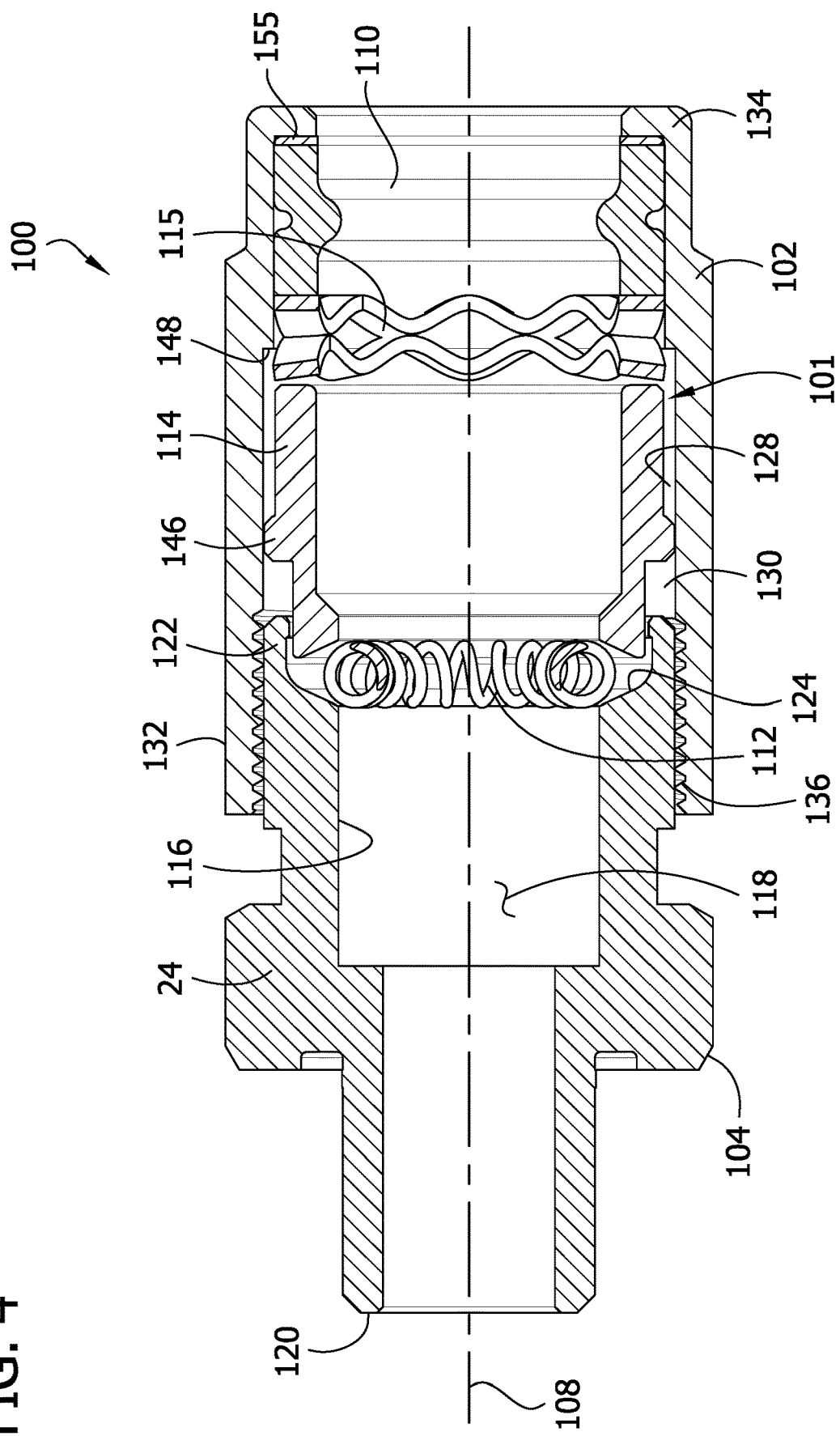
FIG. 4 is a longitudinal section of the cable gland in FIG. 1.
Figure 5:
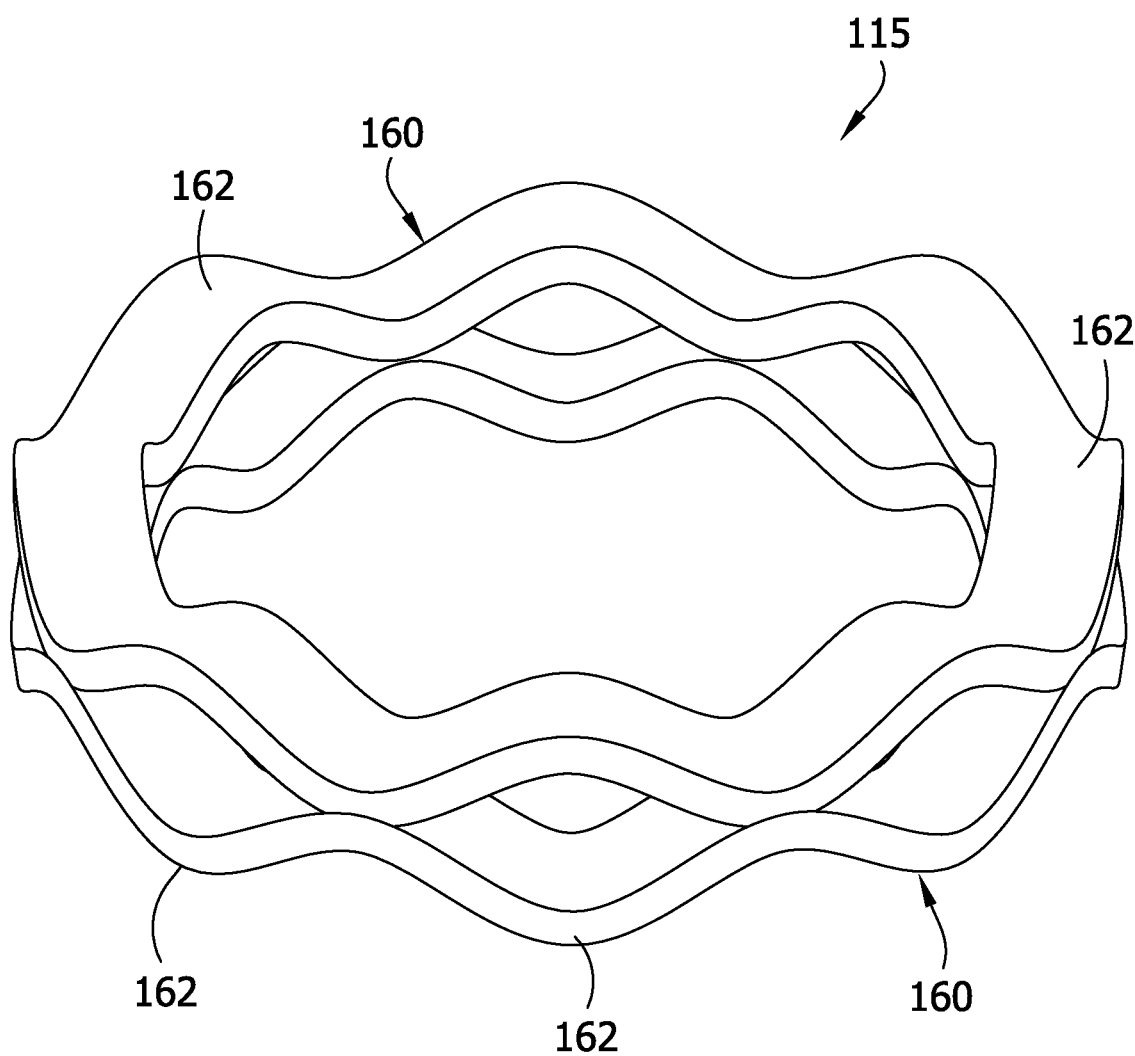
FIG. 5 is a perspective of a wave spring of the cable gland in FIG. 1.

Referring to FIGS. 2-4, an illustrated embodiment of a cable gland constructed according to the teachings of the present disclosure is generally indicated at reference numeral 100. In general, the cable gland 100 is configured to seal the junction between a cable and a device and/or an enclosure into which the cable is extending. As explained in more detail below, the cable gland 100 includes a compression limiting assembly 101 configured to relieve pressure exerted on one or more other internal components of the cable gland by securing a cable received in the cable gland to the cable gland. As a result, the cable gland 100 is able to create a more secure connection with the cable received in the cable gland, and wear and tear on the other components of the cable gland is reduced. The other components of the cable gland 100, also described below, are illustrative and may be of other designs or constructions.

The cable gland 100 includes a gland nut 102 and a hub body 104. The gland nut 102 and the hub body 104 each include a central opening and are coupled together concentrically such that a cable path traverses the cable gland 100 along a longitudinal axis 108. A cable (not shown) may be disposed and/or terminated inside the cable path. To retain the cable within the cable gland 100, a bushing 110 is disposed within the gland nut 102 and that is configured to compress around the cable. Additionally, a grounding mechanism 112 (shown in FIGS. 3 and 4) is disposed within the hub body 104 and which is configured to compress around the cable. In the illustrated embodiment, the grounding mechanism 112 is a garter spring. As described herein, a cable may be an armored cable that includes an outer jacket layer, an armor layer, and at least one conductor. The cable may alternatively be an unarmored cable that includes an outer jacket layer, an insulation layer, and at least one conductor. It should also be appreciated that the cable gland 100 may be used with any other cable layer configuration that enables the assembly to function as described herein.

In operation, the cable gland 100 is a two-piece design such that the cable may be retained by tightening the gland nut 102 (e.g., rotating about the longitudinal axis 108) about the hub body 104. When the gland nut 102 is first tightened, a torque load is applied to the cable gland 100 and the grounding mechanism 112 axially and radially displaces, and compresses around the cable armor, while the bushing 110 remains relatively uncompressed. Once the grounding mechanism 112 reaches the cable armor (for armored cable types), its compression stops or slows down and at least a portion of the torque load is directed towards the bushing 110. As the torque load is applied to the bushing 110, the bushing 110 is displaced and compresses around the cable jacket. During the compression of the bushing 110, the grounding mechanism 112 may continue to receive some torque load and further compress a small or no amount.

In the illustrated embodiment, to reduce or prevent overcompression of the bushing 110, the cable gland 100 includes a compression limiting assembly 101 (shown in FIG. 4) comprising a compression limiter 114 and a stacked wave spring 115 (broadly, a wave spring) that is configured to limit the amount of torque applied to the bushing 110, and thus, control the compression of the bushing 110. This prevents the bushing 110 from undesirably over-compressing and extruding out of the gland nut 102 when the cable gland 100 is tightened to a required or desired torque. After the compression of the bushing 110 and when the gland nut 102 is further tightened, the compression limiter 114 engages with the gland nut 102 such that further displacement of the bushing 110 is reduced or eliminated. Additional torque applied to the cable gland 100, as a result of further tightening of the gland nut 102, will be transferred to the wave spring 115 in the form of stored energy. This prevents the bushing 110 from over-compressing and extruding out of the gland nut 102, while enabling the cable gland 100 to reach tightening torque values as required or desired.

The operation of the cable gland 100, in the illustrated embodiment, is described as compressing the grounding mechanism 112 first, compressing the bushing 110 second, and then directing the further tightening loads to the compression limiting assembly 101. In other examples, the bushing 110 may compress prior to the grounding mechanism 112. In still other examples, the cable gland 100 may compress the bushing 110, the grounding mechanism 112, and the compression limiting assembly 101 in any order, or any order sequence, as required or desired as long as the compression limiting assembly controls the compression limit of the bushing 110 as described herein.

Referring to FIG. 4, the hub body 104 includes an interior wall 116 defining a body opening 118 configured to receive at least a portion of the cable. The hub body 104 has a first end 120 that enables the cable gland 100 to be coupled to a cable termination assembly (not shown), such as a junction box, control center, panelboard, enclosure, and the like, and an opposite second end 122 coupled to the gland nut 102. At the second end 122, an annular recess 124 is defined within the interior wall 116. The grounding mechanism 112 is at least partially disposed within the recess 124 of the body opening 118 and within the hub body 104.

The gland nut 102 includes an interior wall 128 defining a gland nut opening 130 (FIGS. 2 and 4) configured to receive at least a portion of the cable. The gland nut 102 has a first end 132 that couples to the second end 122 of the hub body 104 and an opposite second end 134. In the illustrated embodiment, the interior wall 128 has threads at the first end 132 so that the gland nut 102 may threadingly couple to the second end 122 of the hub body 104 via corresponding threads on an outer wall 136 of the hub body 104. By coupling the gland nut 102 to the hub body 104 through a threaded connection, to tighten the gland nut 102 on the hub body 104, the gland nut 102 can be rotated about the longitudinal axis 108 and with respect to the hub body 104. The tightening of the gland nut 102 on the hub body 104 secures the cable within the cable gland assembly 100 and also establishes a ground path through the cable gland 100. Additionally, this connection assembly enables the gland nut 102 to be completely removed from the hub body 104 as required or desired.

Referring to FIG. 4, the bushing 110 is disposed within the gland nut opening 130 and defines a bushing opening configured to receive the cable therein. In operation, the bushing 110 compresses between the adjacent end of the stacked wave spring 115 and the gland nut 102, and around the cable. This compression around the cable provides a retaining force on the cable to prevenient cable pull out and to enable a secure cable gland 100 and cable connection. Additionally, the bushing 110 facilitates a watertight seal on the outer jacket of the cable to reduce or prevent water penetration into the cable gland 100. In the illustrated embodiment, a slip washer 155 is disposed between the bushing 110 and the second end 134 of the gland nut 102. The slip washer 155 is configured to enable the gland nut 102 to rotate relative to the bushing 110 so that the bushing 110 does not buckle during rotation of the gland nut 102. In other examples, grease may be used to reduce or prevent bucking of the bushing 110.

In one embodiment, the bushing 110 may be formed from a broad range of elastomeric materials (e.g., silicone) that enables the cable gland 100 to be used in a wide variety of temperature ranges. In an aspect, the elastomeric material may enable the cable gland 100 to be used in temperatures between −60° C. and 110° C. In other aspects, the elastomeric material may be used in temperatures of −25° C. and below, in temperatures of −40° C. and below, or in temperatures of −60° C. and below. In further aspects, the elastomeric material may be used in temperatures of 40° C. and above, in temperatures of 60° C. and above, or in temperatures of 110° C. and above. Additionally, the compression limiting assembly 101 restricts or prevents the bushing 110 from being over-compressed and extruding out of the second end 134 of the gland nut 102.

In the illustrated embodiment, the compression limiter 114 of the compression limiting assembly 101 is formed as a generally cylindrical sleeve defining a sleeve opening configured to receive the cable therein. The compression limiter 114 is moveably disposed within the gland nut opening 130 along the longitudinal axis 108. The compression limiter 114 has a first end configured to engage with the grounding mechanism 112, and an opposite second end. The compression limiter 114 further includes a radially extending collar 146 that selectively engages with the interior wall 128 of the gland nut 102 to secure the compression limiter 114 therein. This frictional engagement enables for the gland nut 102 to slide relative to the compression limiter 114 while still facilitating removal of the gland nut from the hub body 104 with the compression limiter coupled thereto. In other examples, the collar 146 may be threadably engaged with the interior wall 128 of the gland nut 102 such that rotational movement of the gland nut corresponds to linear movement of the compression limiter 114. The interior wall 128 of the gland nut 102 includes a radially extending step 148. The collar 146 on the compression limiter 114 is configured to engage with the step 148 and restrict axial movement of the compression limiter 114 relative to the gland nut 102. In either example, one or both of the step 148 and the collar 146 may include knurls, ramps, serrations, etc. to further ensure the engagement therebetween when the step contacts with the collar after compression of the bushing 110. In alternative examples, the step 148 may be formed in the compression limiter 114 and the collar 146 may extend from the gland nut 102 as required or desired.

Figure 6:
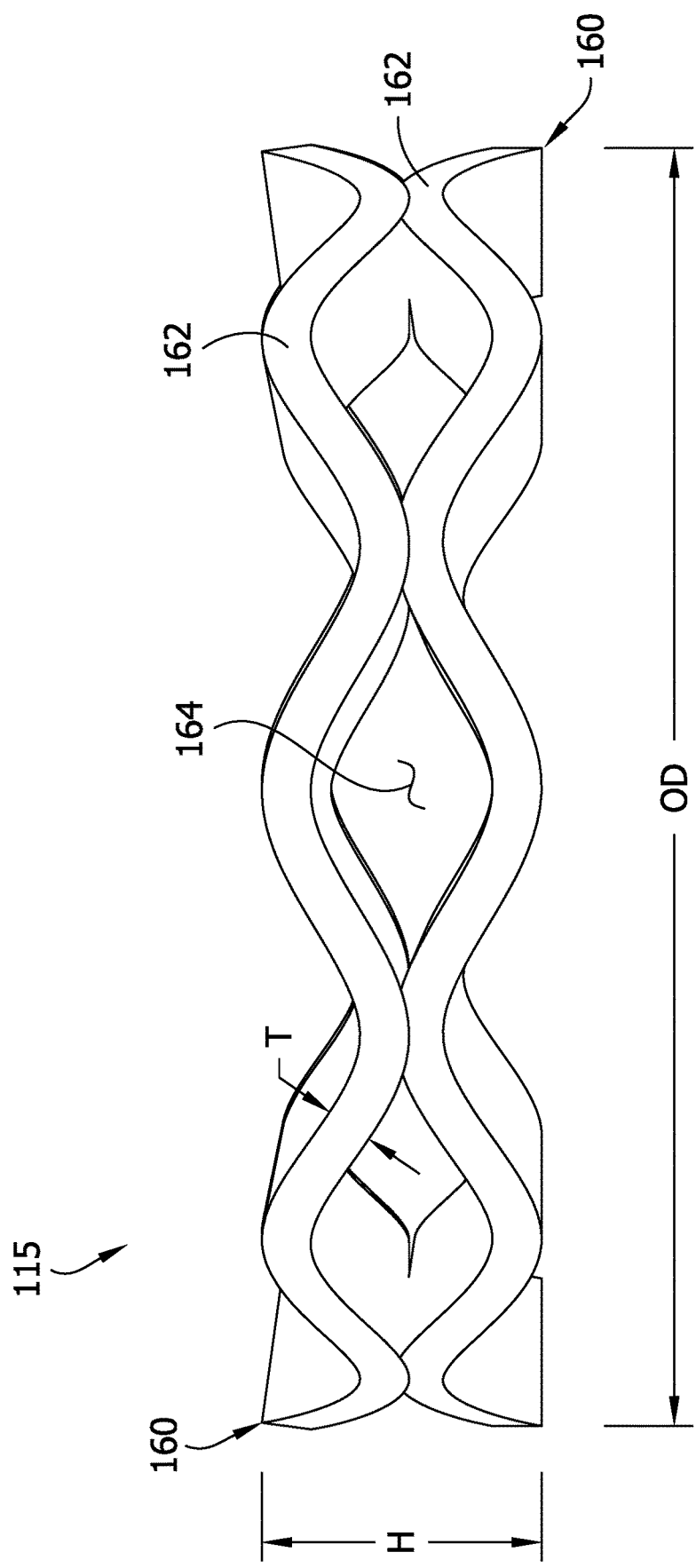
FIG. 6 is a side view of the wave spring.
Figure 7:
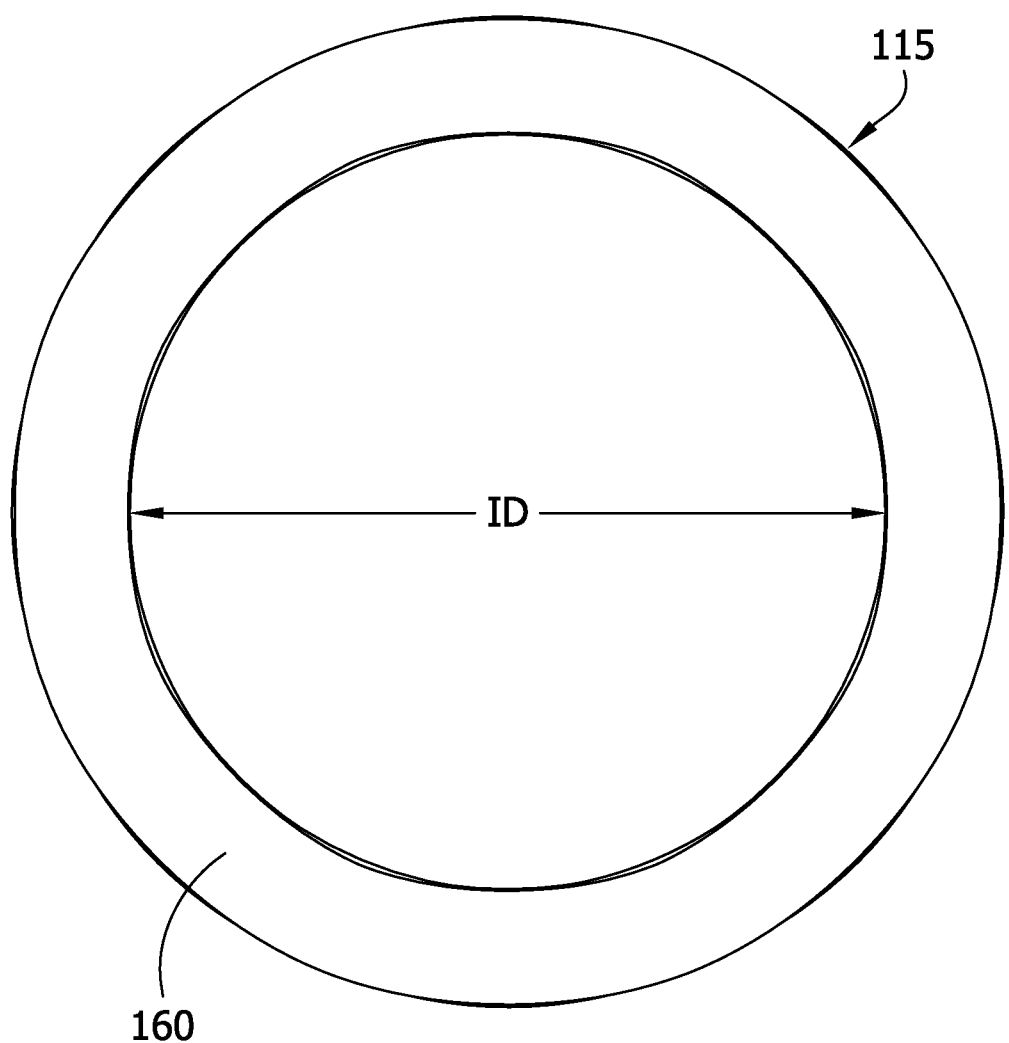
FIG. 7 is an end view of the wave spring.

Referring to FIGS. 4-7, the stacked wave spring 115 is disposed between the bushing 110 and the compression limiter 114 such that the stacked wave spring contacts the second end of the compression limiter at one end of the wave spring and the bushing at the opposite end of the wave spring. The stacked wave spring 115 is configured to have a predetermined stiffness for absorbing compression forces exerted on the cable gland 100, and particularly the bushing 110, during use. Thus, the wave spring 115, in combination with the compression limiter 114, limits the amount of compression force exerted on the bushing 110. The stacked wave spring 115 comprises a generally cylindrical member including a plurality of spring components 160 disposed on top of each other to form a unitary spring structure. In the illustrated embodiment, the stacked wave spring 115 comprises two spring components 160 stacked together. However, additional spring components 160 could be stacked together without departing from the scope of the disclosure. It will be understood that the number of spring components 160 can be adjusted based on the size of the cable gland 100 and/or the range of cable diameters intended for use with the cable gland. Each spring component 160 includes a plurality of waves 162 extending around the spring component. In the illustrated embodiment, each spring component 160 includes eight (8) waves 162. However, it will be understood that depending of the size of the cable gland 100, and thus the size of the wave spring 115, the number of waves 162 may vary. As shown in FIG. 6, the waves 162 of adjacent spring components 160 are offset such that a crest of a wave of a first (e.g., top) spring component 160 is aligned with a valley between adjacent waves 162 of a second (e.g., bottom) spring component 160. This offset configuration forms a plurality of gaps 164 spaced circumferentially around the wave spring 115. Compression of the wave spring 115 causes the waves 162 to flatten out thereby reducing a height H of the wave spring. However, the stiffness of the wave spring 115 resists compression of the spring to a point thereby preventing the compression forces exerted on the spring from being transferred to the bushing 110.

In one embodiment, the stacked wave spring 115 has a compressed height H at working loads extending between ends of the spring of between about 0.08 inches and about 0.25 inches. In one embodiment, the stacked wave spring 115 has a compressed height H at working loads of less than about 0.25 inches. Working loads may range between about 10 lbs. and about 30 lbs. of pressure during use in the cable gland 100. An uncompressed height of the stacked wave spring 115 may range between about 0.1 inches and about 1 inch. In one embodiment, an inner diameter ID (FIG. 7) of the stacked wave spring 115 ranges from between about 0.4 inches and about 4 inches. In one embodiment, a thickness T (FIG. 6) of each spring component 160 is between about 0.01 inches and about 0.02 inches. It will be understood that the stacked wave spring 115 may have other dimensions without departing from the scope of the disclosure. The stacked wave spring 115 may also be made from any suitable material. In one embodiment, the stacked wave spring 115 is made from steel. In one embodiment, the stacked wave spring 115 is made from high-carbon steel. Still other materials are envisioned.

The addition of the wave spring 115 configures the cable gland 100 to withstand higher thrust load within the axial space of the cable gland as only the wire size (i.e., spring component thickness T), number of waves 162 in each spring component 160, wave height and number of turns need to be adjusted to accommodate higher thrust loads. As a result, the wave spring 115 can be configured to maintain constant contact pressure between the cable gland 100 and the cable for a range of cable diameters. This alleviates the effects of clamping pressure on the cables, and cable jacket failure observed in cases of excess clamping pressure in conventional cable glands. Further, production costs can ultimately be reduced and/or optimized because of the wave spring 115 accounts for tolerance variation during manufacturing of the cable gland 100.

Figure 8:
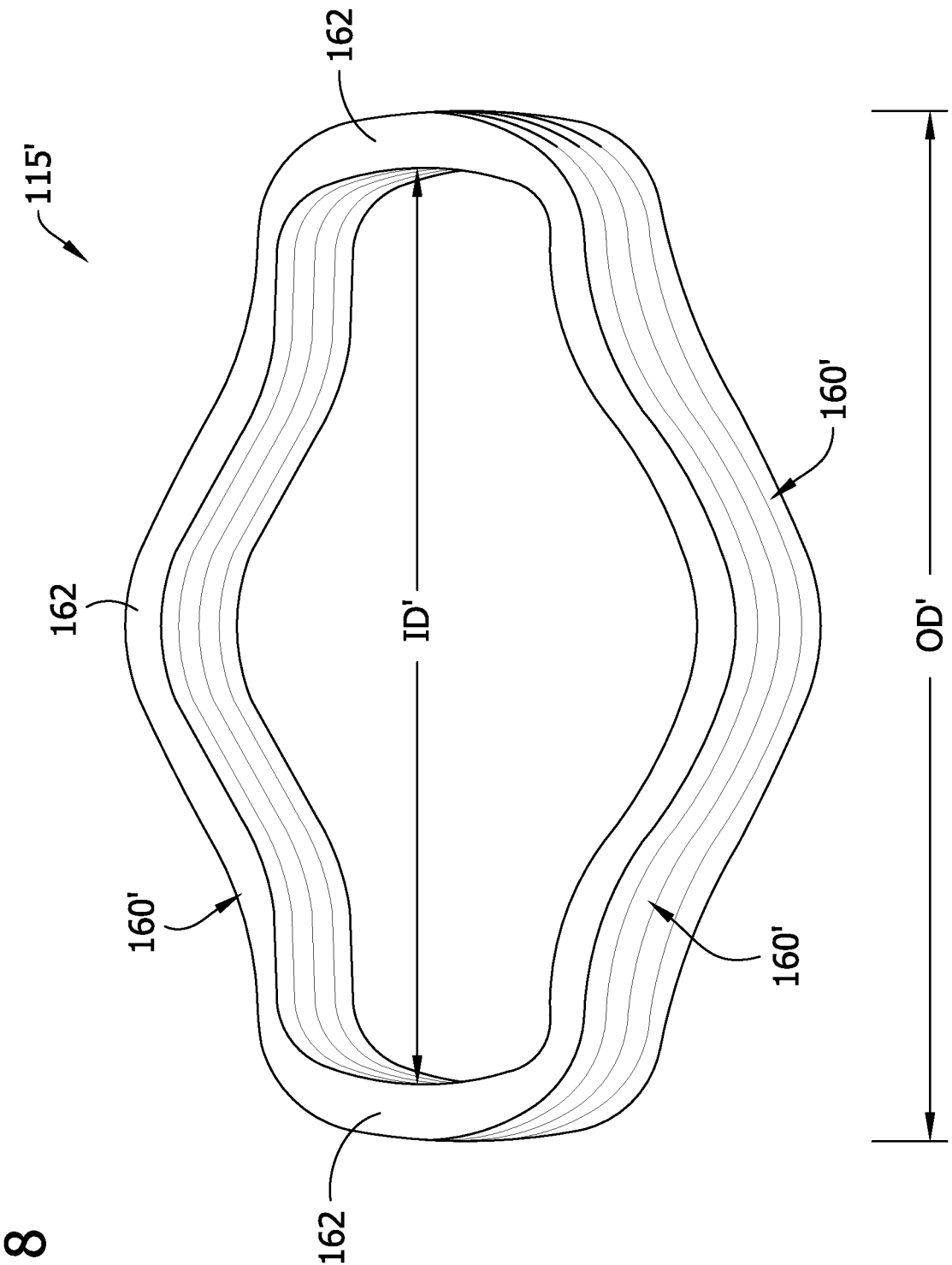
FIG. 8 is a perspective of a wave spring of another embodiment.

Referring to FIG. 8, an alternative embodiment of a stacked wave spring (broadly, a wave spring) is generally indicated at 115'. In this embodiment, each spring component 160' is nested within an adjacent spring component such that the crests of the waves of the adjacent spring components are aligned. As a result, an uncompressed height of the wave spring 115' is shorter than the wave spring 115 of the previous embodiment. In one embodiment, the wave spring 115' has an uncompressed height of between about 0.14 and about 0.15 inches. In one embodiment, the stacked wave spring 115' has a compressed height at working loads extending between ends of the spring of between about 0.08 inches and about 0.15 inches. Working loads for a cable gland including wave spring 115' may range up to about 70 lbs. of pressure during use. In one embodiment, an inner diameter ID' of the stacked wave spring 115' ranges from between about 1 inch and about 1.2 inches. In one embodiment, an outer diameter OD' of the stacked wave spring 115' ranges from between about 1.2 inches and about 1.3 inches. Other dimensions of the wave spring 115' are also envisioned. The wave spring 115' otherwise functions substantially the same as the wave spring 115 of the previous embodiment.

Modifications and variations of the disclosed embodiments are possible without departing from the scope of the invention defined in the appended claims.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A cable gland comprising:
   a gland nut defining a longitudinal axis, the gland nut comprising an interior wall defining a gland nut opening;
   a bushing disposed within the gland nut, wherein the bushing is compressible and defines a bushing opening configured to receive a cable therein;
   a compression limiting assembly comprising a compression limiter moveably disposed at least partially within the gland nut, and a spring disposed between the compression limiter and the bushing; and
   a body defining a body opening configured to receive at least a portion of the cable therein, the body configured to couple to the gland nut, wherein upon coupling of the gland nut to the body, the gland nut moves along the longitudinal axis compressing the bushing between the gland nut and the compression limiting assembly and around the cable;
   wherein the interior wall of the gland nut defines a first portion having threads and a second portion being free of threads, the spring being disposed entirely in the second portion of the gland nut, and wherein the second portion includes a first diameter section and a second diameter section, the second diameter section having a diameter that is smaller than a diameter of the first diameter section, at least a portion of the spring being disposed in the second diameter section.

2. The cable gland of claim 1, wherein the spring comprises a stacked wave spring.

3. The cable gland of claim 2, wherein the stacked wave spring comprises a plurality of spring components disposed on top of each other.

4. The cable gland of claim 3, wherein each spring component comprises a plurality of waves extending around the spring component.

5. The cable gland of claim 4, wherein the waves of a first of said spring components are offset from the waves of a second of said spring components adjacent to the first spring component.

6. The cable gland of claim 4, wherein the waves of a first spring component are nested within the waves of a second of said spring components adjacent to the first spring component.

7. The cable gland of claim 1, wherein the spring has a height of less than about 0.25 inches.

8. The cable gland of claim 1, further comprising a grounding mechanism disposed within the body opening.

9. The cable gland of claim 8, wherein the grounding mechanism comprises a spring configured to ground and/or retain the cable.

10. The cable gland of claim 1, wherein the compression liming assembly and the bushing are secured within the gland nut opening such that the cable gland is a two-piece design.

11. The cable gland of claim 1, wherein the spring is formed from steel.

12. A cable gland comprising:
    a body configured to receive at least a portion of a cable;
    a grounding mechanism disposed at least partially in the body;
    a gland nut configured to receive at least a portion of the cable and removably couple to the body;
    a compressible bushing disposed in the gland nut; and
    a stacked wave spring disposed in the gland nut between the compressible bushing and the grounding mechanism, wherein upon coupling of the gland nut to the body, the stacked wave spring is configured to limit compression of the compressible bushing;
    wherein an interior wall of the gland nut defines a first portion having threads and a second portion being free of threads, the spring being disposed entirely in the second portion of the gland nut, and wherein the second portion includes a first diameter section and a second diameter section, the second diameter section having a diameter that is smaller than a diameter of the first diameter section, at least a portion of the spring being disposed in the second diameter section.

13. The cable gland of claim 12, wherein the stacked wave spring comprises a plurality of spring components disposed on top of each other.

14. The cable gland of claim 13, wherein each spring component comprises a plurality of waves extending around the spring component.

15. The cable gland of claim 14, wherein the waves of a first spring component are offset from the waves of a second of said spring components adjacent to the first spring component.

16. The cable gland of claim 14, wherein the waves of a first spring component are nested within the waves of a second of said spring components adjacent to the first spring component.

17. The cable gland of claim 12, wherein the stacked wave spring has a height of less than about 0.25 inches.

18. The cable gland of claim 12, wherein the grounding mechanism comprises a spring configured to ground and/or retain the cable.

19. The cable gland of claim 12, wherein the stacked wave spring is formed from steel.

20. A cable gland comprising:
- a gland nut defining a longitudinal axis, the gland nut comprising an interior wall defining a gland nut opening;
- a bushing disposed within the gland nut, wherein the bushing is compressible and defines a bushing opening configured to receive a cable therein;
- a body defining a body opening configured to receive at least a portion of the cable therein, the body configured to couple to the gland nut, wherein upon coupling of the gland nut to the body, the gland nut moves along the longitudinal axis compressing the bushing around the cable; and
- a compression limiting assembly disposed at least partially within the gland nut and configured to maintain a constant contact pressure between the cable gland and the cable, the compression limiting assembly comprising a compression limiter moveably disposed at least partially within the gland nut, and a spring disposed between the compression limiter and the bushing;

wherein the interior wall of the gland nut defines a first portion having threads and a second portion being free of threads, the spring being disposed entirely in the second portion of the gland nut, and wherein the second portion includes a first diameter section and a second diameter section, the second diameter section having a diameter that is smaller than a diameter of the first diameter section, at least a portion of the spring being disposed in the second diameter section.

* * * * *